Patented Mar. 6, 1923.

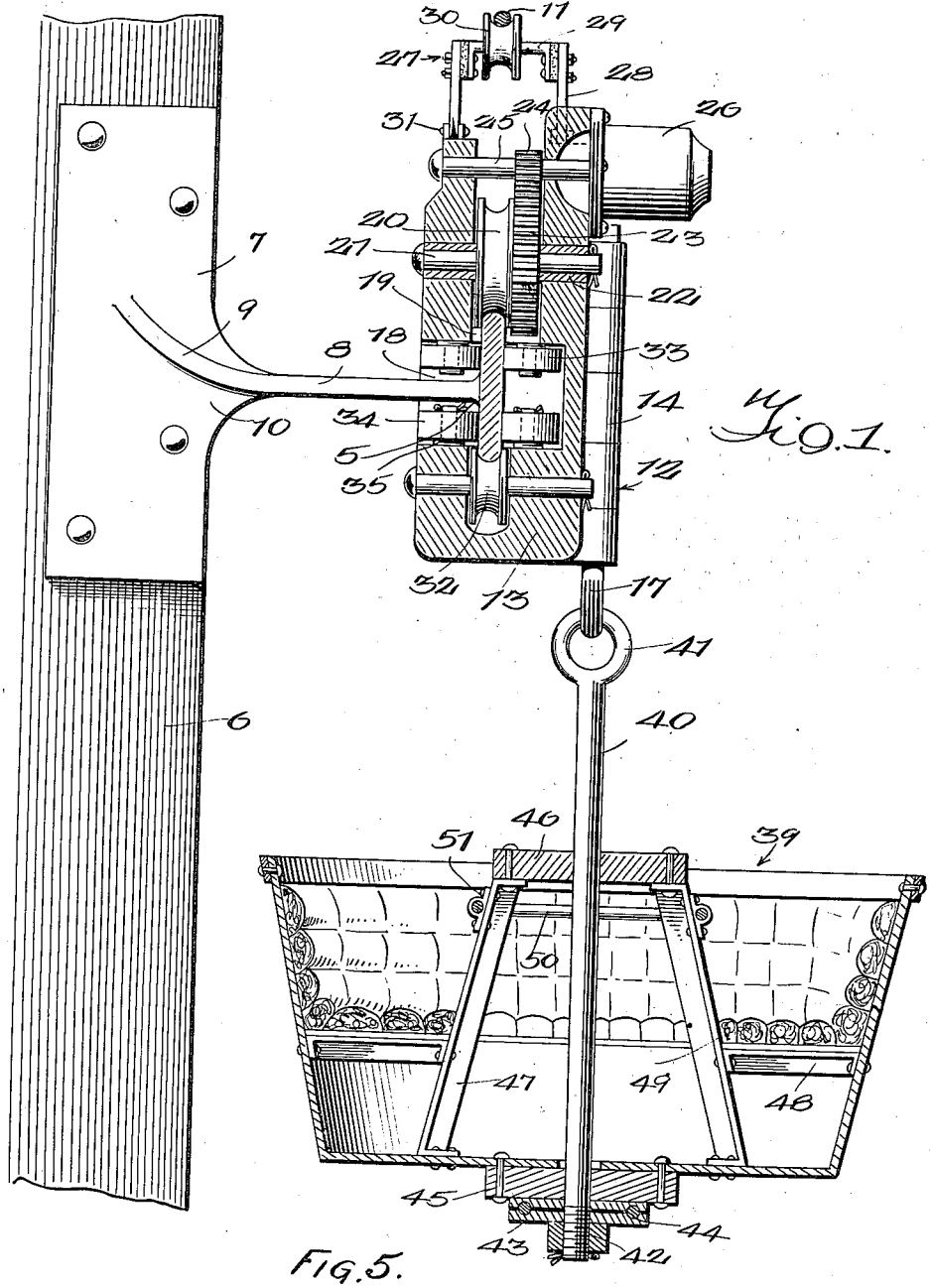

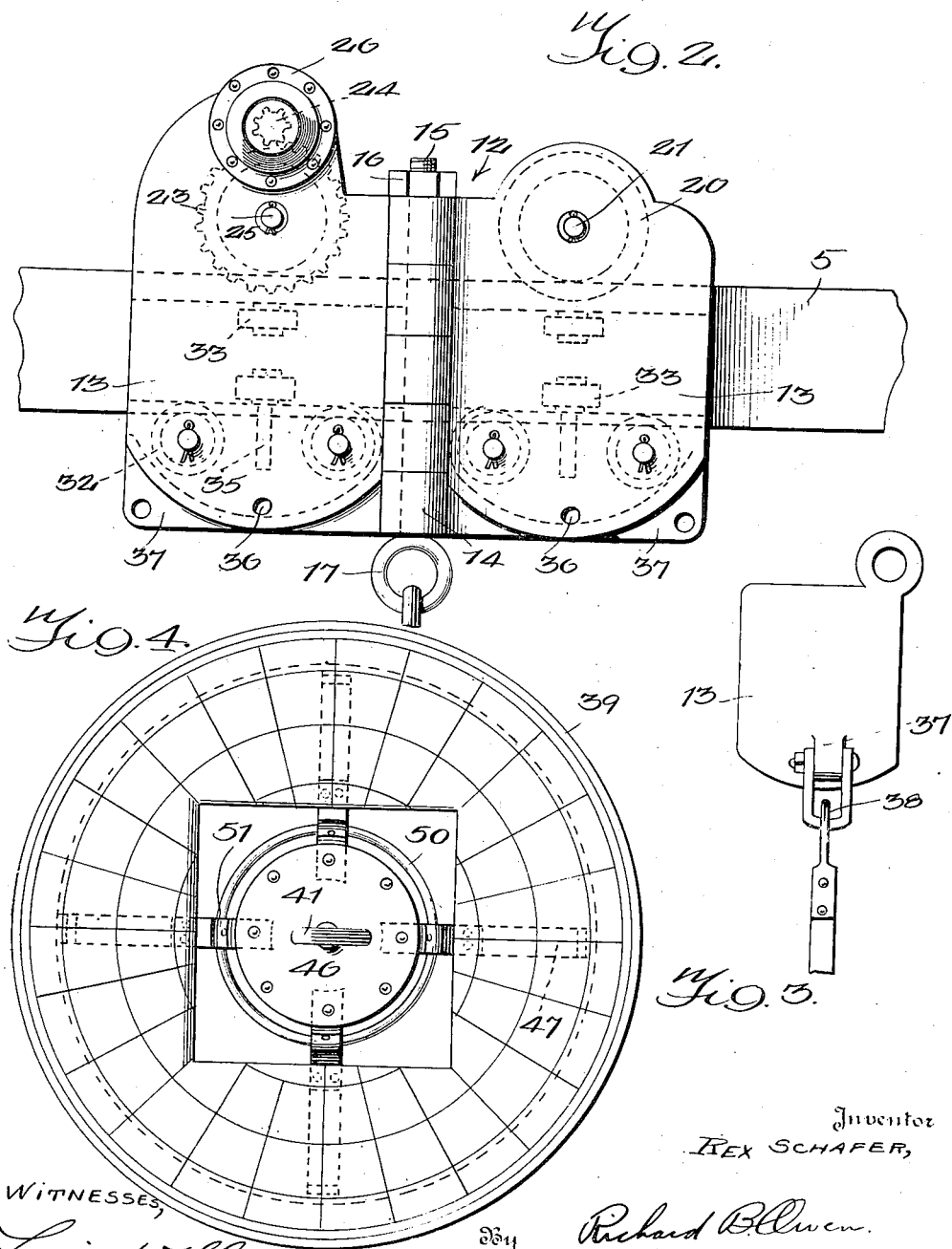

1,447,895

UNITED STATES PATENT OFFICE.

REX SCHAFER, OF LONG BEACH, CALIFORNIA.

AMUSEMENT DEVICE.

Application filed June 19, 1922. Serial No. 569,250.

*To all whom it may concern:*

Be it known that I, REX SCHAFER, a citizen of Canada, residing at Long Beach, in the county of Los Angeles and State of California, have invented certain new and useful Improvements in Amusement Devices, of which the following is a specification.

This invention relates generally to overhead carriers, and more particularly to a device of this character designed chiefly for amusement purposes although of course, it will be obvious that the device is adaptable for a multitude of other uses.

An important object of the invention resides in the provision of a side slung carrier truck, which is of an inexpensive construction and yet durable and efficient in operation and embodies a construction whereby the same may ride freely upon an overhead rail having a lateral support, and which is of such construction that it can be manufactured and placed in use at the minimum expense.

Another important object of the invention is to provide a carrier truck which is of sectional construction so that the various sections may assume various angular relations with respect to each other whereby movement of the truck around curves will be facilitated, and the friction created between the truck and rail will be reduced to the minimum.

A further object of the invention resides in the provision of a carrier truck having impelling means associated therewith, said means being electrically operated, the electrical energy being derived from a trolley wire and conducted thereto through a simple and efficient arrangement carried by the truck.

Still another object of the invention resides in the provision of a carrier truck composed of a pair of sections or units connected for relative movement, each section or unit comprising an independent carrier truck in itself capable of disconnection from its co-acting section so as to be capable of carrying a separate load in spaced relation to the co-acting truck.

Another object of the invention resides in the provision of a carriage adapted for particular connection to the carrier truck whereby the former can have movement relative to the latter, the carriage being so constructed as to be revolvably mounted.

Other objects and advantages of the invention will become apparent during the course of the following description.

In the accompanying drawings forming a part of the description and wherein like numerals are employed to designate like parts throughout the several views, Figure 1 is a vertical section through the invention, Figure 2 is a side elevation of the carrier truck, Figure 3 is a bottom plan of one section of the truck with coupling means associated therewith, and Figure 4 is a top plan of the carriage.

Figure 5 is a plan view of a portion of the rail.

In the drawings wherein I have shown the embodiment of my invention which is at present preferred, the numeral 5 designates an overhead rail or one in suspension, which may be arranged horizontally or on an incline, and in the present instance or embodiment of the invention, embodies a plurality of curves and bends, it being understood that for amusement purpose the rail would be tortuous and include inclined portions as well as perfectly horizontal ones to add thrills to the ride in a device mounted on the rail. It will of course, be understood that the rail is held in suspension by a plurality of posts, one of which is shown at 6, and as the means for supporting the rail from each post is identically the same, a description of one will suffice for all. This means consists of a bracket or plate 7 which is rigidly secured to a side of a post 6 in any suitable manner and has extending therefrom and laterally of the post, an arm 8, the outer end of which joins to a vertical side of the rail 5 as clearly shown. This arm 8 joins to the rail between its upper and lower longitudinal edges and supports the rail in a vertical plane as shown. In order that the arm 8 of each bracket will be braced sufficiently to sustain the weight upon the rail, reinforcing ribs 9 and web portions 10 extend from the plate 7 to the arm so as to properly reinforce the same. The supporting arms for the rail are made relatively long so that the latter will be spaced a sufficient distance from the posts 6, whereby a carriage suspended from the rail will avoid engagement with the posts.

In the preferred embodiment of the invention, a trolley wire 11 is hung directly above the rail 5 for conducting electricity for a purpose which will be presently described. A carrier truck 12 rides on the rail 5 and embodies a construction whereby it is slung from the side of the rail to contribute toward the function of supporting the load carried by the truck laterally of the supporting structure or posts 6. This carrier in the present instance consists of a pair of truck frames 13 which are hinged together on a vertical pivot at their meeting ends. The inner end of each frame 13 is provided with a plurality of spaced hinge knuckles 14 which extend laterally of the outer side of the carrier frame, and the hinged knuckles of the two frames 13, are associated to form the well known type of hinge joint as shown in the drawings. A hinge pin 15 is extended through the openings of the aligned knuckles to hingedly connect the same. The upper end of this hinge pin is screw threaded as shown in Fig. 2, and a nut 16 is threaded thereon to abut the uppermost knuckle of the joint so that the hinge pin will be suspended therein. The lower end of this pin is provided with an eye 17 for the purpose of holding a load in suspension from the carrier truck. As each truck frame 13 embodies the same construction for being mounted on the rails, a description of one will suffice for both.

The frame of each truck 12 is provided with an opening 18 extending transversely thereof, it being noted that the side of the opening at the inner side of the frame opens into this side so as to permit the admission of a portion of the rail supporting arm when the truck is mounted on the rail 5. A cavity 19 is provided in the frame to extend at right angles to the opening 18 and it will be noted that this cavity extends above and below the opening 18 and has its relative upper open end opening into the truck or frame. It will therefore be seen that the carrier frame is provided with a cruciform opening extending transversely of the frame, and as clearly seen in Fig. 1 the rail 5 is of such size that it extends above and below the opening 18 when the frame is positioned upon the rail. This particular arrangement renders it necessary to tilt the carrier truck in placing it upon the rail, and effectively prevents the truck from being derailed.

The supporting wheel or roller 20 of one frame 13 is arranged in the cavity 19 above the opening 18 and is mounted upon an axle or stub shaft 21 which extends transversely through the cavity as seen. If desired, the ends of the axle 21 can be mounted in the bushings 22 so as to reduce friction and wear on the frame of the truck.

The supporting wheel or roller 20 of one frame 13 is adapted to be driven so as to move the carrier t... ...e rail, and for this purpose a pinion 23 is secured to one side of the wheel and adapted for mesh with a spur gear 24 keyed to the extended end of a motor driven shaft 25. This motor driven shaft extends transversely of the frame as shown, and projects from an electric motor 26 which is fastened to the outside of the truck frame in any suitable manner. Electric current is conducted to the truck frame by a trolley mechanism 27 which consists of a pair of spaced arms 28 pivotally connected at their lower ends to the top of the frame 13, and the upper ends of the arms are bridged by the trolley wheel axle 29 which is insulated from the arms as shown. A trolley wheel 30 is rotatably mounted on the axle and is of such size that it can slide longitudinally on the axle to compensate for any misalignment of the trolley wire 11 with the rail 5. Suitable conductors are led from the axle to the electric motor 26. The trolley wheel 30 presses upward on the trolley wire and is held in close engagement therewith by means of a spring 31 having connection with the trolley mechanism and the truck frame to normally urge the arms 28 of the trolley mechanism upwardly so as to cause the trolley wheel to bear firmly on the wire 11.

As the driven wheel 20 of the truck frame engages with the top of the rail 5, it will be seen that the weight of the same is sustained by this wheel. In order to prevent accidental vertical movement of the truck frame with respect to the rail, a pair of spaced rollers 32 are rotatably mounted in the lower end of the cavity 19 and below the opening 18 so as to be engaged with the relative bottom of the rail as clearly seen in Fig. 1. The carrier truck is retained in upright position and parallel to the rail by two pairs of horizontally disposed rollers 33, and 34. The pair of rollers 33 are arranged in vertical alignment on a vertical axis to engage the relative outer side of the rail, while the pair of similarly arranged rollers 34 are adapted for engagement with the relative inner side of the rail. Each roller of the two pairs is mounted upon the reduced end of a vertically arranged screw 35 which is adapted to be turned into the frame as seen. A cotter pin is passed through the free reduced end of the screw to removably retain the roller associated therewith. It will be noted that the space between the pair of rollers 34 is sufficient to permit removal of the rollers one at a time so that the carrier truck can be readily removed from the rail when desired.

As the two truck frames 13 are joined together, it is only necessary to drive one of the rollers 20 thereof, as is well understood, so that only one of the truck frames 13 is provided with the electric motor and driving mechanism. As seen in Fig. 2, the bottom of each truck frame is provided below the shaft 21 and in vertical alignment therewith, with means for suspending a load therefrom, the means in the present instance consisting of an opening 36 for the passage of suitable attaching means. In order that two or more truck frames may be coupled together in spaced relation to each other, the relative lower outer corner of each frame is provided with an outwardly extending apertured lug 37 with which can be associated, any suitable coupling means 38 which will properly retain the truck frames in spaced relation at all times, and prevent one frame from overtaking the other on down grades.

It will of course be obvious that the two sections of the carrier truck 12 can be disconnected and arranged in tandem as set forth above, by simply removing the nut 16 from the hinge pin 15 and spacing the two truck frames by the coupling means 38 so that a load can be suspended from each truck frame.

For the purpose of suspending a carriage 39 from the truck, a sling member 40 consisting of an elongated rod is provided and equipped at its upper end with an eye or loop 41 adapted for connection with the eye 17 of the hinge pin 15. The lower end of the sling rod is screw threaded and a nut 42 is threaded thereon for supporting a ball race 43. This ball race consists of a pair of plates of substantial size rotatably mounted on the lower end of the sling rod, and separated by ball bearings 44. A base plate 45 is also rotatably mounted on the sling rod and is supported on the uppermost plate of the ball race. The carriage 39 in the present instance, consists of a receptacle of tub-like configuration having its bottom fastened to the top of the base plate 45 in any suitable manner. The bottom of the carriage is apertured for the passage of the sling rod which is adapted to extend upwardly through the carriage and through a crest block 46 supported upon and bolted to the upper ends of a plurality of upwardly converging standards 47 arranged around the sling element and fastened at their lower ends to the bottom of the carriage. These standards are spaced apart, and to each between its ends is connected a seat supporting bar 48, the outer end of which is fastened to the side of the carriage. A plurality of seat sections 49 which are preferably padded are supported on the bars 48 and are arranged around the supporting standards 47 so that the limbs of passengers can extend through the crest block supporting structure. For the purpose of safety, a hand rail 50 encircles the upper ends of the standards 47 and is secured thereto by straps 51 bolted to the standards so that the passengers of the carriage may hold onto the rail and avoid being ejected from the carriage during the course of its travel.

From the foregoing description, it will be seen that the carriage is revolvably mounted on the sling element and furthermore by its particular suspension is free to sway and swing from side to side as the carrier truck moves on the rail 5. Whenever the carrier truck turns a curve, the weight of the passengers in the carriage will cause the same to swing outwardly of the rail and post, and due to the fact that the carriage will not be evenly balanced by the passengers, it will revolve around the sling element and add many thrills to the ride in the carriage.

The foregoing description and accompanying drawings have reference to what might be considered to be the approved form of my invention. It is desired to be understood that I may make changes in the construction, combination and arrangement of parts, materials, dimensions, etc., as may prove expedient and fall within the scope of the appended claims.

Having thus fully described and illustrated my invention, what I claim is:—

1. An amusement device comprising a sectional carrier truck, the sections of the truck being hinged together on a vertical pivot whereby the turning movement of the truck on curves of the rails is facilitated, and a carriage connected to said vertical pivot.

2. An amusement device comprising a carrier truck mounted on an overhead rail, a sling element depending from the carrier and loosely connected thereto, a supporting base rotatably mounted on the sling element, and a carriage carried by the supporting base.

3. The combination with a tortuous rail in suspension, a carrier truck mounted thereon, and a carriage suspended from the truck and being revolvable, said carriage being induced to revolve by the carrier traveling around the tortuous rail and unbalanced weight in the carriage.

4. A carrier truck having an opening therein and opening into a side thereof, a suspension roller carried by the truck, a roller carried by the truck and engageable with one side of the rail upon which the device is mounted, and a pair of rollers also carried by the truck for engagement with the opposite side of the rail, said pair of rollers being spaced apart for the passage of supporting means of the rail.

5. A carrier truck adapted to be mounted upon a rail in suspension, said truck being provided with a cruciform opening therein extending from one end to the other of the truck one portion of the opening having communication with the side of the truck, a suspension wheel mounted in the opening and engageable with the rail, and a pair of removable rollers associated with the portion of the opening which opens into the side of the truck.

6. An amusement device comprising a carrier truck, a sling element depending therefrom, a carriage revolvably mounted on the sling element, a crest block carried by the carriage adjacent its upper end for the passage of the sling element, seats arranged within the carriage for the purpose set forth, and an annular hand rail carried by the crest block inward of said seat.

In testimony whereof I affix my signature in presence of two witnesses.

REX SCHAFER.

Witnesses:
 EVELYN WATSON,
 GERTRUDE M. WHITE.